Patented Mar. 25, 1941

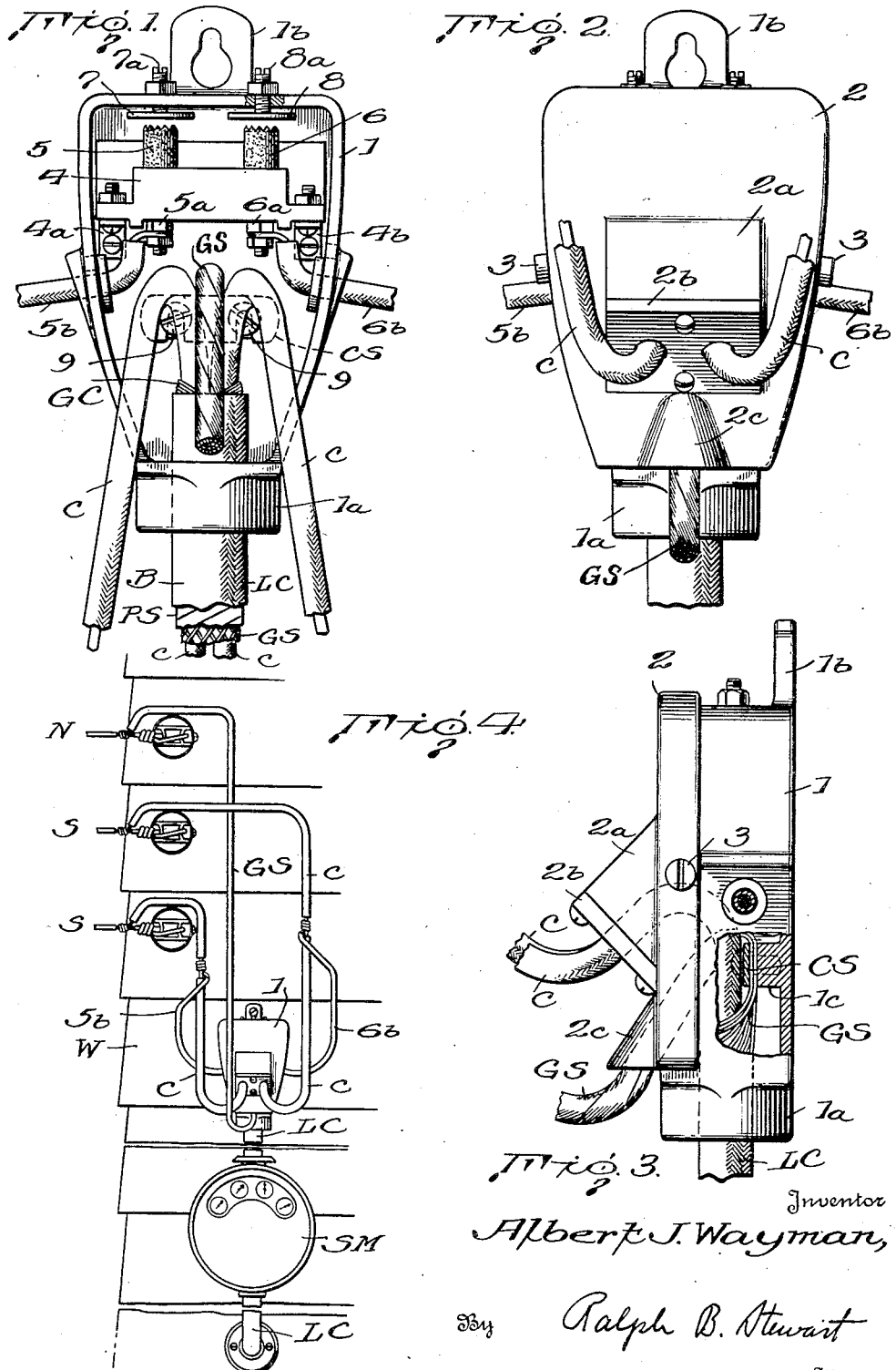

2,236,326

UNITED STATES PATENT OFFICE 2,236,326

COMBINED SERVICE CAP AND LIGHTNING ARRESTER

Albert J. Wayman, Youngstown, Ohio

Application April 13, 1939, Serial No. 267,664

2 Claims. (Cl. 175—30)

This invention relates to a combined service cap and lightning arrester and is particularly useful for introducing electric service lines into a house or building.

In bringing service lines into a building, it is customary to anchor the lines to the building by insulators secured to the outer wall, and connections are made by lead-in conductors from the service lines through a terminal box or service cap mounted on the outer wall of the building to the switch box located inside of the building. The electric meter which measures the service rendered is interposed in the lead-in conductors between service cap and the inside switch box and may be located either inside of the building or on the outside. The lead-in conductors may be formed of flexible armoured cable or conductors provided with pipe conduit.

An object of the present invention is to provide an improved service cap to facilitate connection from the service lines to the service conduit or cable.

A further object is to provide for adequate protection against damage to the service meter, or to devices connected to the service wires inside of the building, due to high voltage impulses on the service lines, such as impulses caused by lightning, or by other causes. In my invention a lightning arrester is embodied in the service cap construction, thereby providing a unitary arrangement which greatly facilitates installation and reduces the cost of manufacture.

Referring to the drawing, Figure 1 is a front elevational view of my improved combined service cap and lightning arrester showing the arrangement with the front cover removed;

Figure 2 is a front elevational view showing the service cap with the front cover in place;

Figure 3 is a side elevational view of the service cap with parts broken away to show the arrangement for grounding the service cap to the grounding wires of the lead-in cable, and Figure 4 is a fragmentary view showing the service cap as applied to the exterior of a building where the service meter is also mounted outside of the building.

Referring to the drawing, the service cap is formed of a box-like housing 1 having a reduced lower end which terminates in a sleeve portion 1a which may be internally threaded for screw connection with the upper end of a lead-in conduit. The upper end of the box 1 is provided with an apertured lug 1b for securing the box to the wall of the building by means of a screw.

The box 1 is provided with a cover 2 which is removably secured to the box by any suitable means such as the screws 3. On the front face of the cover 2 a sloping hood 2a is formed and the open end of this hood is closed by a block of insulation 2b, the block being provided with apertures through which the lead-in conductors CC pass. A second sloping hood 2c is formed on the front face of the cover 2 immediately below the hood 2a and the hood 2c provides an outlet aperture for grounding strands GS of the lead-in cable LC.

The box 1 and its cover 2 are preferably formed of cast aluminum although they may be formed of any other suitable non-corroding and non-rusting metal.

In the upper end of the box 1, an elongated block of insulating material 4 such as porcelain, is mounted by suitable means such as brackets 4a and 4b secured to the back wall of the box. A pair of electrodes 5 and 6 are carried by insulating block 4, and these electrodes are provided with suitable terminals 5a and 6a for connection to wires 5b and 6b leading out of the box 1 through apertures formed in the side walls of the box and provided with suitable insulating bushings. The electrodes 5 and 6 are preferably formed of carbon and are provided with discharge points on the surface of the upper ends as shown. A pair of disc electrodes 7 and 8 are adjustably supported in line with electrodes 5 and 6 respectively. These electrodes may be mounted in any suitable manner for adjustment, but I have shown one arrangement in which the electrodes are provided with threaded stems 7a and 8a which have threaded engagement with and pass through the upper wall of box 1, and suitable lock nuts are provided on the stems for holding the electrodes 7 and 8 in any adjusted position. The electrodes 7 and 8 are preferably formed of non-arcing metal.

In the illustrated embodiment of my invention, I have shown the use of a lead-in cable LC of conventional construction consisting of a pair of conductors CC having grounding strands GS spirally wound about the conductors CC. A metallic protecting sheath PS is wound around the outside of grounding conductors GS and in electrical contact therewith, and an outer braiding B of non-conducting fabric is applied over the protective sheath S.

The manner in which the service cap is installed is shown in Figure 4 where W indicates the outside wall of the building to which the incoming service lines SS and the neutral line N are anchored by means of suitable insulators. The service cap is mounted closely adjacent the insulators at the upper end of the lead-in cable LC, and the service meter SM is also mounted on the exterior wall of the building and interposed in the lead-in cable LC. When installing the service cap, the exterior braiding B and the protective sheath PS are removed from the upper end of the lead-in cable LC for a sufficient distance to permit the conductors CC and the grounding strands GS to extend from the cap to the service wires SSN. The grounding strands GS are unbraided from around the conductors CC and are twisted together and secured to the back wall of the cap in the manner shown in Figs. 1 and 3. The preferred construction for this purpose involves the provision of a boss or projection Ic formed integral with the back wall of box I for supporting the strands GS and against which the strands are clamped by means of a clamping strap CS which is secured to the boss Ic by screws 9. The free ends of the strands GS pass out through the hood 2c and are connected to the neutral service conductor N as shown in Figure 4. The free ends of the lead-in conductors CC are passed through the apertures in plate 2b and are connected to the service lines SS as shown in Figure 4. Conductors 5b and 6b leading from the lightning arrester electrodes 5 and 6 are connected to the conductors CC as shown. It will be understood that grounding strands GS are connected to a suitable ground located either inside the building or outside.

In using my combined service cap and lightning arrester, the electrodes 7 and 8 are adjusted to permit arcing from electrodes 5 and 6 at a predetermined over-voltage condition on the service lines SS, and since the electrodes 7 and 8 are connected to the grounding strands GS through the casing I of the service cap, the grounding strands will protect the meter and any other apparatus which may be connected to the service lines from damage which might be caused by lightning or by surges due to other causes.

It will be noted that the service cap is so constructed that the cover to the cap may be readily removed without disturbing the electrical connections, and this greatly facilitates inspection of the cap and renewal of any parts which may become damaged.

It will be understood that the grounding strands GS complete a connection from the neutral line N to the neutral terminal on the switch inside the house. If desired, the cable LC may be enclosed in a pipe conduit from the cap I to the switch box inside the house. Also, where a pipe conduit is employed, the lead-in conductors need not be formed as a cable, but three separate conductors may be run through the conduit to serve as the lead-in and neutral conductors.

While I have explained the principle of my invention and illustrated a preferred embodiment thereof, it will be obvious that the details of construction may be varied without departing from the principle of the invention.

What I claim is:

1. In combination, a service cap formed of a metallic casing and having inlet and outlet apertures for lead-in conductors, a grounding conductor surrounding said lead-in conductors and being connected to said metallic casing, a pair of insulated discharge terminals mounted within said casing connections from said lead-in conductors to said discharge terminals, a cooperating electrode mounted adjacent each of said insulated discharge terminals and being electrically connected to said metallic casing, and means extending to the outside of said casing for adjusting the length of the discharge gap between each insulated terminal and its cooperating electrode.

2. In combination, a pair of incoming service lines and a neutral line, a service cap formed of a metallic casing provided with an inlet aperture for a lead-in cable formed of two conductors surrounded by grounding strands, and having separate outlet apertures for said lead-in conductors and said grounding strands, means for electrically connecting said grounding strands to said metallic casing, said lead-in conductors being connected respectively to said service lines, means for connecting said neutral line to said grounding strands, a pair of insulated discharge terminals mounted within said casing and arranged to form discharge paths with respect to said casing, and connections from said lead-in conductors to said discharge terminals.

ALBERT J. WAYMAN.